(12) United States Patent
Doddaiah et al.

(10) Patent No.: US 11,740,816 B1
(45) Date of Patent: Aug. 29, 2023

(54) INITIAL CACHE SEGMENTATION RECOMMENDATION ENGINE USING CUSTOMER-SPECIFIC HISTORICAL WORKLOAD ANALYSIS

(71) Applicant: Dell Products L.P., Hopkinton, MA (US)

(72) Inventors: Ramesh Doddaiah, Westborough, MA (US); Malak Alshawabkeh, Franklin, MA (US); Kaustubh Sahasrabudhe, Westborough, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/698,004

(22) Filed: Mar. 18, 2022

(51) Int. Cl.
  *G06F 3/06* (2006.01)

(52) U.S. Cl.
  CPC ............ *G06F 3/0635* (2013.01); *G06F 3/067* (2013.01); *G06F 3/0613* (2013.01); *G06F 3/0631* (2013.01); *G06F 3/0644* (2013.01); *G06F 3/0659* (2013.01)

(58) Field of Classification Search
  CPC .... G06F 3/0635; G06F 3/0613; G06F 3/0631; G06F 3/0644; G06F 3/0659; G06F 3/067
  See application file for complete search history.

(56) References Cited

U.S. PATENT DOCUMENTS

| | | | |
|---|---|---|---|
| 7,660,945 B1* | 2/2010 | Lee | G06F 12/0866 711/113 |
| 11,099,754 B1* | 8/2021 | Mallick | G06F 3/061 |
| 2005/0268031 A1* | 12/2005 | Matsui | G06F 12/0871 711/E12.07 |
| 2010/0115197 A1* | 5/2010 | Lee | G06F 12/0804 711/E12.019 |
| 2013/0103911 A1* | 4/2013 | Bulut | G06F 12/0866 711/144 |
| 2014/0337562 A1* | 11/2014 | Long | G06F 3/0679 711/126 |
| 2016/0179672 A1* | 6/2016 | Dell | G06F 12/0822 711/122 |
| 2021/0173782 A1* | 6/2021 | Krasner | G06F 12/0223 |
| 2021/0342078 A1* | 11/2021 | Krasner | G06F 3/0683 |
| 2021/0365376 A1* | 11/2021 | Roberts | G06F 12/0864 |

* cited by examiner

Primary Examiner — Ryan Bertram
(74) Attorney, Agent, or Firm — ANDERSON GORECKI LLP

(57) ABSTRACT

A data storage node includes a plurality of compute nodes that allocate portions of local memory to a shared cache. The shared cache is configured with mirrored and non-mirrored segments that are sized as a function of the percentage of write IOs and read IOs in a historical traffic workload profile specific to an organization or storage node. The mirrored and non-mirrored segments are separately configured with pools of data slots. Within each segment, each pool is associated with same-size data slots that differ in size relative to the data slots of other pools. The sizes of the pools in the mirrored segment are set based on write IO size distribution in the historical traffic workload profile. The sizes of the pools in the non-mirrored segment are set based on read IO size distribution in the historical traffic workload profile.

6 Claims, 7 Drawing Sheets

INITIAL CACHE SEGMENTATION RECOMMENDATION ENGINE USING CUSTOMER-SPECIFIC HISTORICAL WORKLOAD ANALYSIS

TECHNICAL FIELD

The subject matter of this disclosure is generally related to shared cache segment allocations in data storage systems.

BACKGROUND

High-capacity data storage systems such as storage area networks (SANs) and storage arrays are used to maintain logical storage objects that can be accessed by multiple host servers. The storage systems include specialized, interconnected compute nodes that manage access to data stored on arrays of non-volatile drives. The compute nodes respond to input-output (IO) commands from instances of host applications that run on the host servers. Examples of host applications may include, but are not limited to, software for email, accounting, manufacturing, inventory control, and a wide variety of other business processes. Host application data is logically stored on the storage objects, which abstract the non-volatile drives on which the host application data is actually stored.

It has long been standard practice in the art to use a single, fixed size data allocation unit for data access so that storage system metadata is practical to manage. The data allocation units are sometimes referred to as tracks (TRKs). The single, fixed TRK size is selected as a design choice and is generally proportional to the manageability of the metadata, but inversely proportional to resource utilization efficiency. Using a larger TRK size can reduce the resource burden on memory and processing resources for metadata management but decreases the efficiency of managed drive utilization by increasing unused space. The basic allocation unit of a storage system is distinct from hard disk drive (HDD) tracks that characterize spinning disk storage architecture. An HDD track is a physical characteristic that corresponds to a concentric band on a platter. The basic allocation unit of a storage system is larger in size than HDD tracks and is not limited by the physical architecture of a spinning platter.

It has also long been standard practice in the art to mirror the volatile memory of pairs of the interconnected compute nodes for failover. Mirroring causes all TRKs in volatile memory of a primary compute node to also be in volatile memory of a secondary compute node so that the secondary compute node can quickly take responsibility for IO processing in the event of failure of the primary compute node.

SUMMARY

It has recently been proposed to implement selective mirroring based on whether data in volatile memory is stored on non-volatile drives. It has also been proposed to simultaneously support multiple data allocation unit sizes. In order to implement selective mirroring, the volatile memory may be divided into mirrored and non-mirrored segments. In order to simultaneously support multiple data allocation unit sizes, pools of different sized data slots may be created. Some aspects of the presently disclosed invention are predicated in part on recognition that supporting multiple TRK sizes and implementing selective mirroring creates new problems. Different organizations and different storage nodes tend to generate and service a variety of IO workloads that vary in both size and type. Depending on a variety of factors, the read : write ratio of an IO workload and distribution of IO sizes may vary widely. Thus, a default segmentation configuration can lead to inefficient operation and resource starvation. For example, an organization that generates an IO workload that is dominated by large size read IOs will inefficiently utilize the resources of a storage array that is configured with a relatively large, mirrored cache segment and relatively large size non-mirrored cache segment allocations to small data slot size pools.

In accordance with some implementations, a method comprises calculating a mirrored memory segment size for a storage node based on an historical traffic workload, the storage node comprising a first compute node with a first local memory, a portion of which is allocated to a shared cache, and a second compute node with a second local memory, a portion of which is allocated to the shared cache; and configuring the shared cache with a mirrored memory segment characterized by the calculated size.

In accordance with some implementations, an apparatus comprises: a storage node comprising a first compute node with a first local memory, a portion of which is allocated to a shared cache, and a second compute node with a second local memory, a portion of which is allocated to the shared cache, the shared cache configured with a mirrored memory segment characterized by a size calculated based on an historical traffic workload.

In accordance with some implementations, a non-transitory computer-readable storage medium storing instructions that when executed by a computer perform a method comprising: calculating a mirrored memory segment size for a storage node based on an historical traffic workload, the storage node comprising a first compute node with a first local memory, a portion of which is allocated to a shared cache, and a second compute node with a second local memory, a portion of which is allocated to the shared cache; and configuring the shared cache with a mirrored memory segment characterized by the calculated size.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
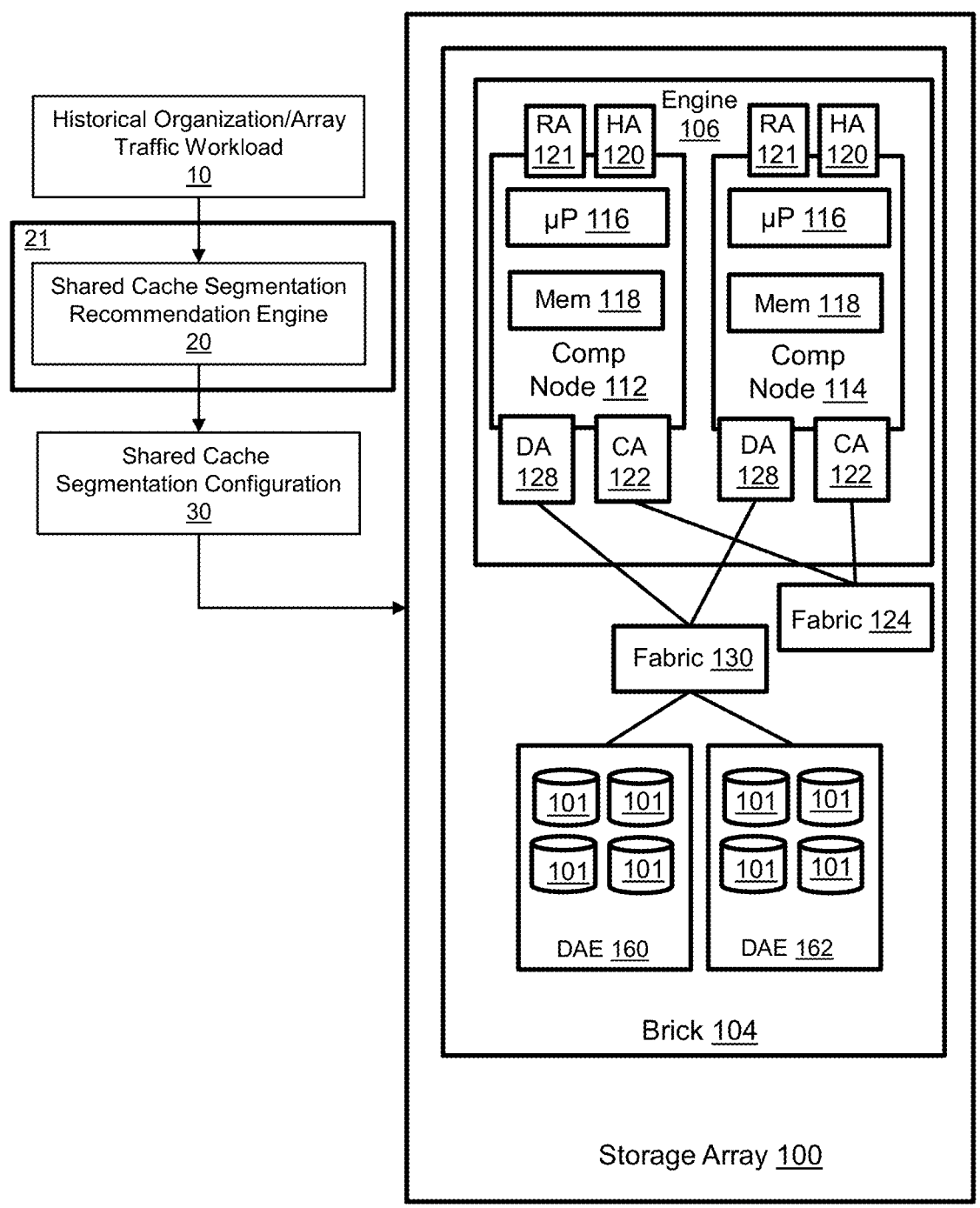
FIG. 1 illustrates a shared cache segmentation recommendation engine that configures shared cache segments of a storage node.

FIG. 1 illustrates a shared cache segmentation recommendation engine 20 that configures shared cache segments of a storage array 100. The shared cache segmentation recommendation engine 20 may include software, specialized hardware, or both in a management station 21 that includes non-transitory, computer-readable storage and processors. Historical traffic workload data 10 of an organization or a storage node such as a storage array is provided to the shared cache segmentation recommendation engine 20 as input. A shared cache segmentation configuration 30 is calculated by the recommendation engine based on the input and provided to the storage array 100. Because many organizations use multiple storage nodes and the traffic workloads serviced by those storage nodes may be relatively uniform or may vary, the input may be organization-specific or storage node-specific. In other words, depending on the traffic workload variability for a specific situation, shared cache segmentation configuration 30 may be calculated based on either the historical traffic workload data of a specific storage node or an entire organization.

The storage array 100 includes at least one brick 104. The brick 104 includes an engine 106 and one or more disk array enclosures (DAEs) 160, 162. Each engine 106 includes two interconnected compute nodes 112, 114 that are arranged as a pair for failover and may be referred to as "storage directors." Although it is known in the art to refer to the compute nodes of a SAN as "hosts," that naming convention is avoided in this disclosure to help distinguish the network server hosts from the compute nodes 112, 114. Nevertheless, the host applications could run on the compute nodes, e.g., on virtual machines or in containers. Each compute node is implemented as a separate blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103, 104. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101.

Figure 2:
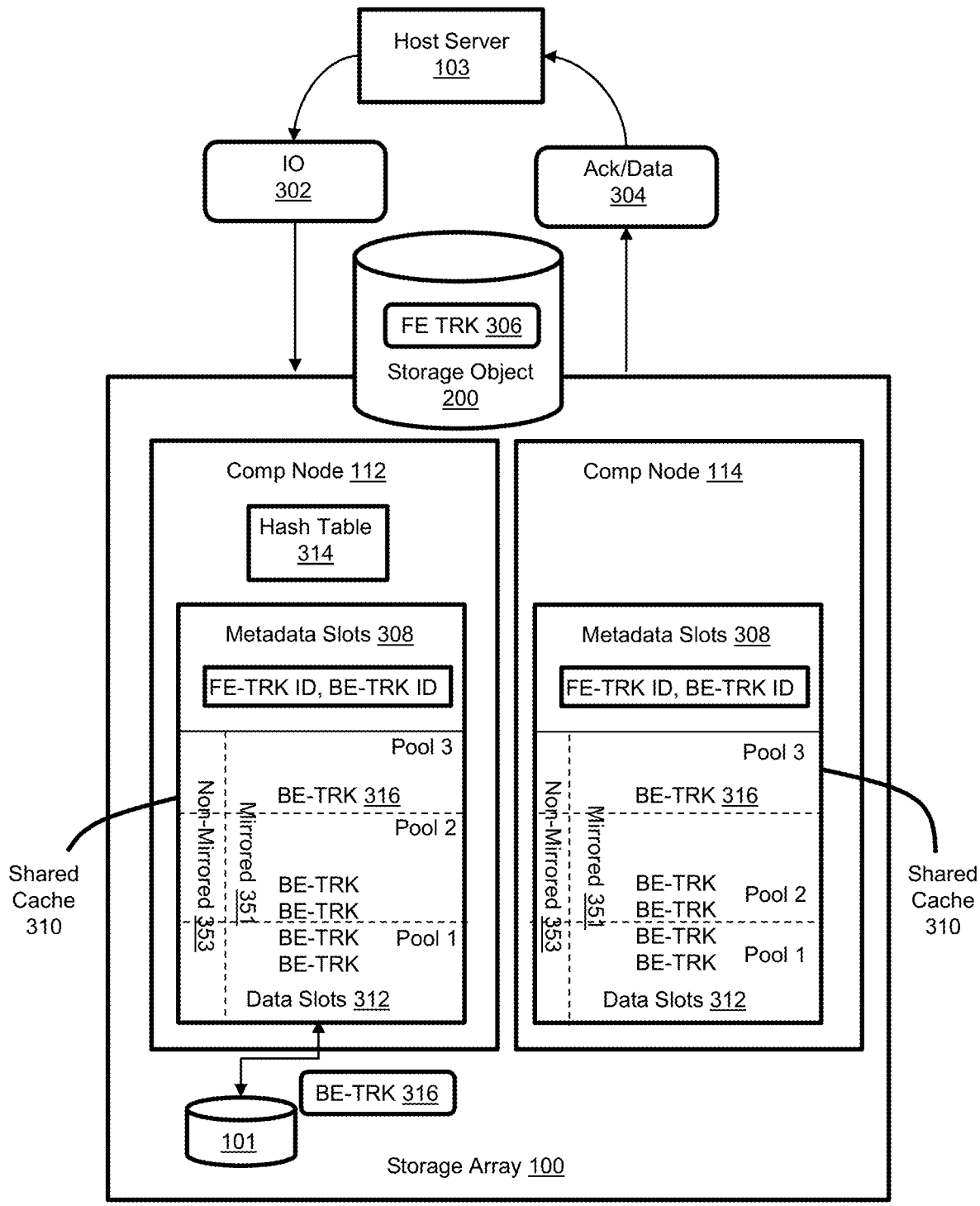
FIG. 2 illustrates use of shared cache in the storage node of FIG. 1.

Referring to FIGS. 1 and 2, host application data is persistently stored on the managed drives 101 and, because the managed drives are not discoverable by the host servers, logically stored on a storage object 200 that can be discovered by the host servers. Without limitation, storage object may be referred to as a volume, device, or LUN, where a logical unit number (LUN) is a number used to identify logical storage volumes in accordance with the small computer system interface (SCSI) protocol. From the perspective of the host server, the storage object is a single disk having a set of contiguous logical block addresses (LBAs) on which data used by the instances of a host application resides. However, the host application data is stored at non-contiguous addresses on various managed drives 101. There may be a large number of host servers and the storage array may maintain a large number of storage objects.

Each compute node 112, 114 allocates a fixed amount of its local memory 118 to a shared cache 310 that can be accessed by all compute nodes of the storage array using direct memory access (DMA). The shared cache 310 includes metadata slots 308 and data slots 312, each of which is a fixed allocation of the shared cache 310. The basic allocation unit of storage capacity that is used by the compute nodes to access the managed drives is a back-end track (BE-TRK). The host application data is logically stored in front-end tracks (FE-TRKs) on the production storage object 200 and actually stored on BE-TRKs on the managed drives. The FE-TRKs are mapped to the BE-TRKs and vice versa by FE-TRK IDs and BE-TRK IDs, which are pointers that are maintained in the metadata slots 308. More specifically, the BE-TRK IDs are pointers to BE-TRKs of host application data in the data slots. The data slots 312, which function to hold data for processing IOs, are divided into a mirrored segment 351 and a non-mirrored segment 353. Each segment is divided into a plurality of pools (pool 1, pool 2, pool 3). The sizes of the data slots correspond to the sizes of the BE-TRKs and the terms data slot and BR-TRK maybe used interchangeably when referring to segment allocations. Each pool contains same-size data slots for holding BE-TRK data, and the sizes of the data slots/ BE-TRKs differs between pools. For example, and without limitation, pool 1 may contain only 16 KB data slots, pool 2 may contain only 64 data slots, and pool 3 may contain only 128 KB data slots.

The shared cache 310 is used to service IOs from the host server 103. In the illustrated example, compute node 112 receives an IO 302 from host 103 with storage object 200 as the target. IO 302 could be a Read or Write to a FE-TRK 306 that is logically stored on the storage object 200. A response to a Write IO is an Ack, whereas a response to a Read IO is data. The response is collectively represented as Ack/Data 304. The compute node 112 uses information in the IO to identify a metadata page corresponding to FE-TRK 306, e.g., by inputting information such as the storage object ID and LBAs into a hash table 314. The hash table 314 indicates the location of the corresponding metadata page in the metadata slots 308. The location of the metadata page in the shared cache may be local or remote relative to compute node 112. A BE-TRK ID pointer from that metadata page is obtained and used by the compute node 112 to find the corresponding data slot that contains BE-TRK 316 which is associated with FE-TRK 306. The BE-TRK 316 is not necessarily present in the data slots when the IO 302 is received because the managed drives 101 have much greater storage capacity than the data slots so data slots are routinely flushed to create free data slots. If the IO 302 is a Read and the corresponding BE-TRK 316 is not present in the data slots, then the compute node 112 locates and retrieves a copy of BE-TRK 316 from the managed drives 101. More specifically, the BE-TRK 316 is copied into an empty data slot in the pool with the closest sized data slots that are ≥BE-TRK 316 size in the non-mirrored segment 353. That copy is then used to respond to the host server and the data is eventually flushed from the data slots. If the IO 302 is a Write and the corresponding BE-TRK 316 is not present in the data slots, then the compute node 112 places the Write data into an empty data slot in the pool with the closest sized data slots that are ≥BE-TRK 316 size in the mirrored segment 351. In accordance with mirroring, the data is copied to the corresponding mirrored segment and pool of compute node 114. The data is eventually destaged to BE-TRK 316 on the managed drives, e.g., overwriting the stale data on the managed drives and flushing the data from the data slots.

Figure 3:
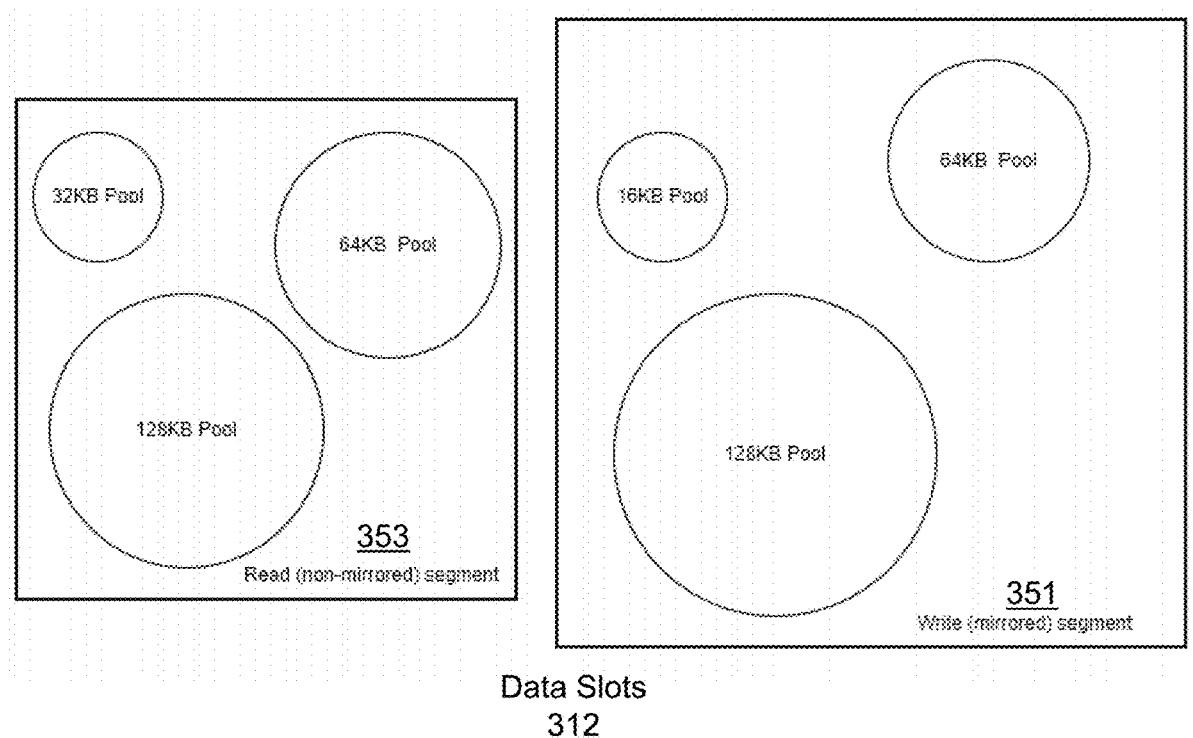
FIG. 3 illustrates data slot segments and pools.
Figure 4:
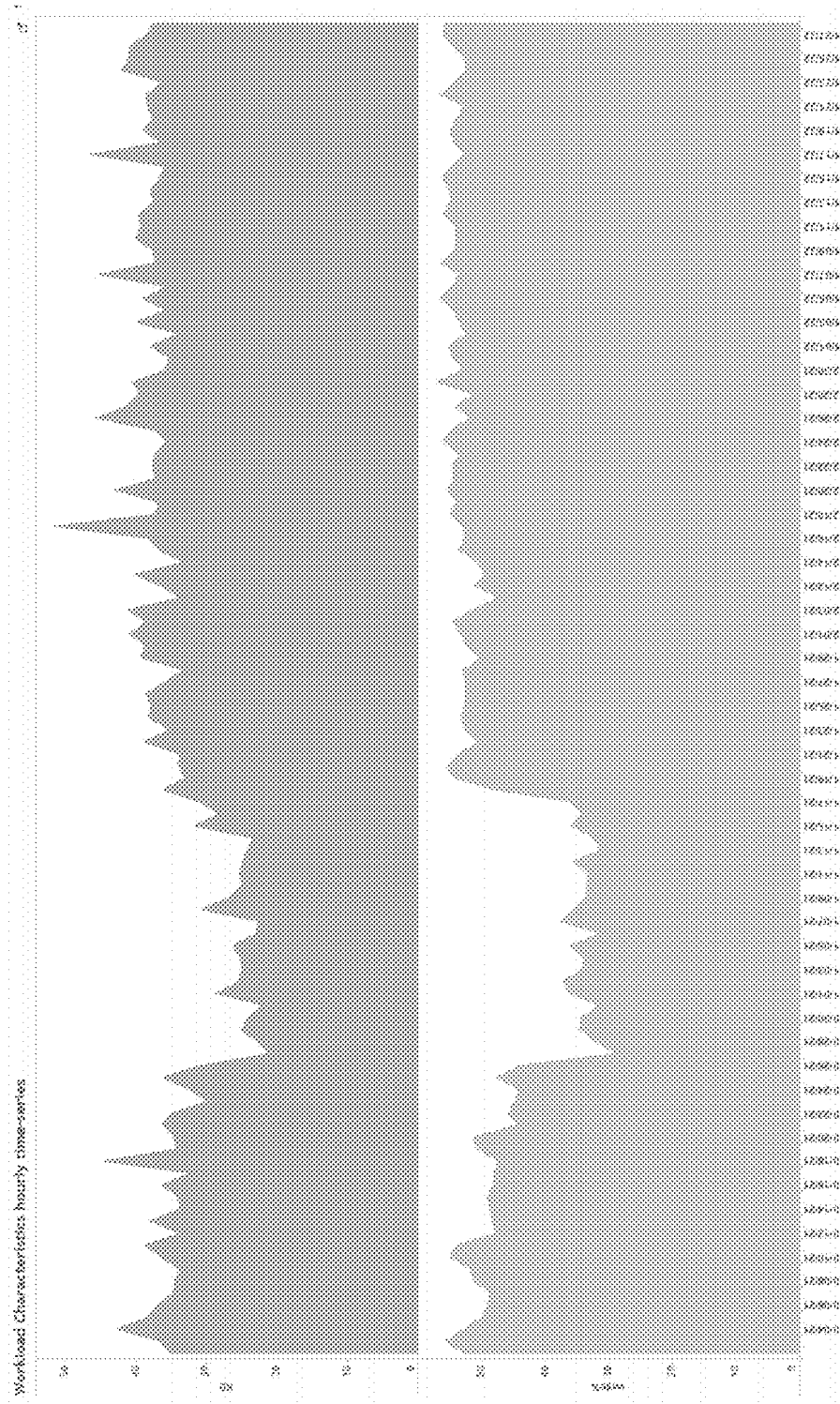
FIG. 4 illustrates part of a historical IO workload.
Figure 5:
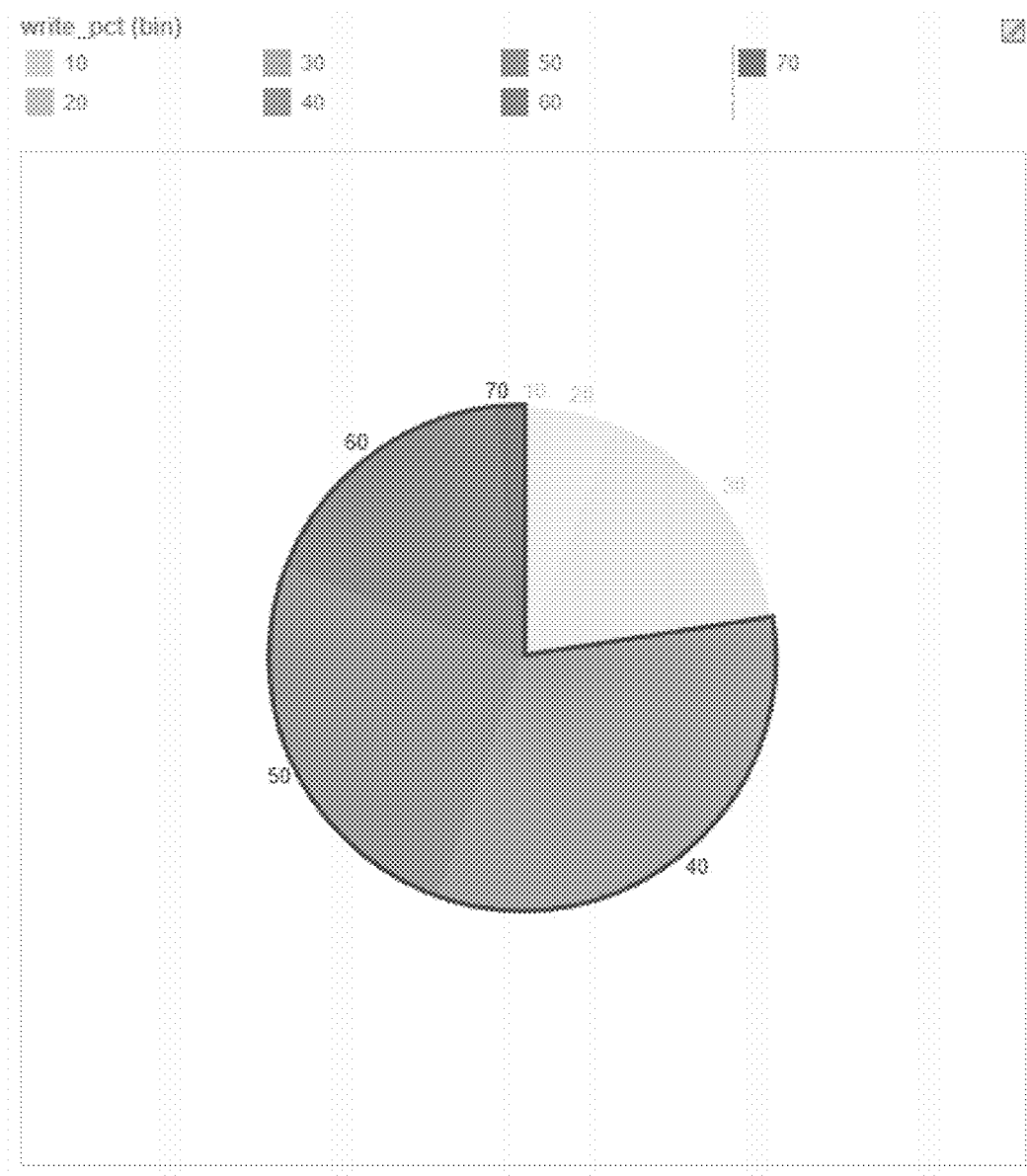
FIG. 5 illustrates a Write IO percentage analysis of the historical IO workload of FIG. 4.
Figure 6:
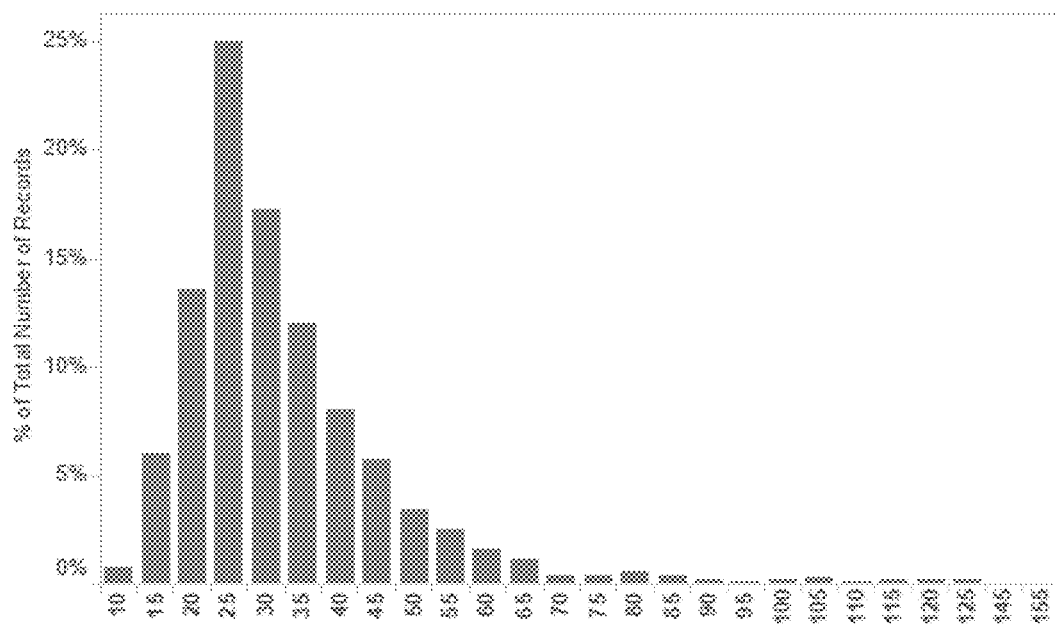
FIG. 6 illustrates IO size distribution and recommended initial configuration for cache segments for the historical organization/array traffic workload of FIG. 4.
Figure 6:
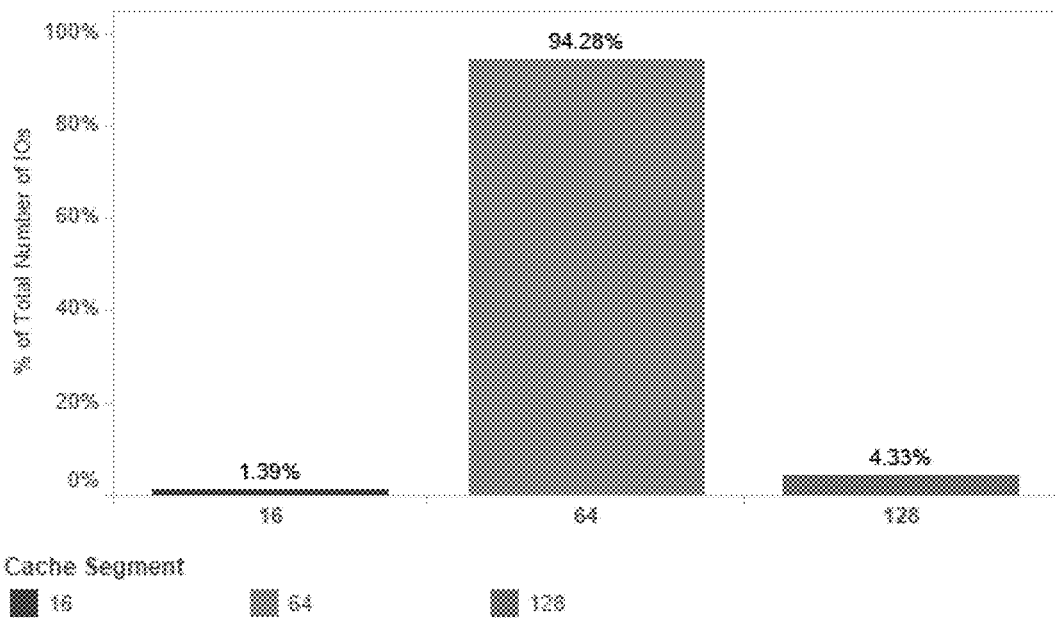
Figure 7:
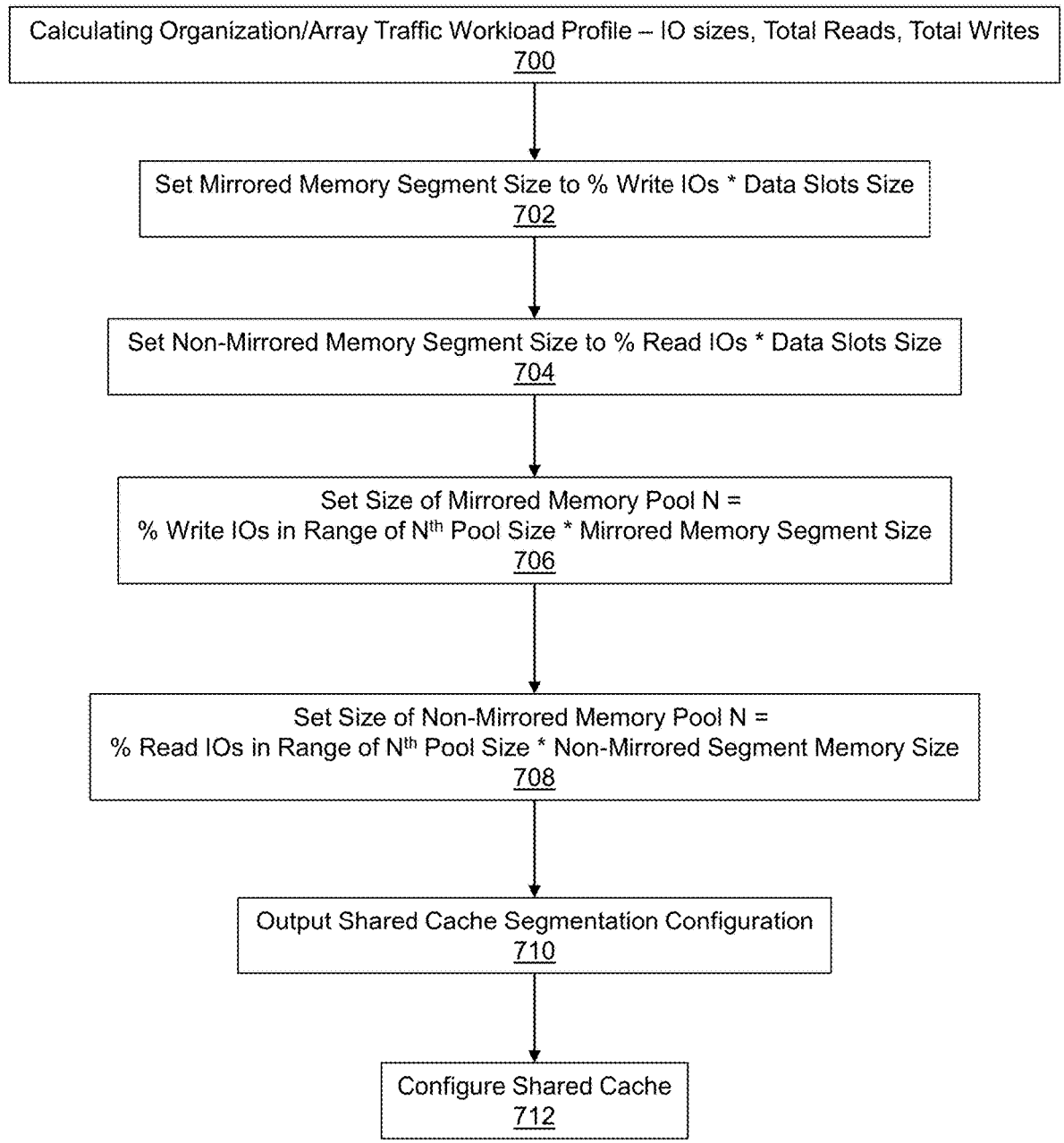
FIG. 7 illustrates operation of the shared cache segmentation recommendation engine.

FIG. 3 illustrates data slot 312 segments and pools. The mirrored segment 351, which is used for Write data, may differ in size relative to the non-mirrored segment 353, which is used for Read data. For example, a configuration with a relatively larger mirrored segment 351 may be created for organizations that historically generate Write-heavy IO workloads. In contrast, a configuration with a relatively larger non-mirrored segment 353 may be created for organizations that historically generate Read-heavy IO workloads. Similarly sized mirrored and non-mirrored segments may be created for organizations that historically generate balanced (read : write) IO workloads. The data slot sizes of the pools can be configured based on historical IO workloads, and the data slot sizes of the pools may differ between the mirrored and non-mirrored segments. In the illustrated example, the non-mirrored segment 353 includes, in ascending order according to size, a pool of 32 KB BE-TRKs, a larger pool of 64 KB BE-TRKs, and a larger pool of 128 KB BE-TRKs. The mirrored segment 351 includes, in ascending order according to size, a pool of 16 KB BE-TRKs, a larger pool of 64 KB BE-TRKs, and a larger pool of 128 KB BE-TRKs. The sizes of the BE-TRKs that characterize the pools and size of the pools may be configured based on historical IO workloads such that a relatively larger pool of large size BE-TRKs is used when the historical IO workload includes mostly large size IOs, or such that a relatively larger pool of small size BE-TRKs is used when the historical IO workload includes mostly small size IOs.

Referring to FIGS. 4 through 7, historical IO workload data may include raw data, statistical data, or both. The historical IO workload data indicates or can be processed to obtain IO sizes and Read/Write mix. Step 700 is calculating an IO traffic workload profile of an organization or storage array. The IO traffic workload profile includes IO sizes and percentages of Reads and Writes. Step 702 is setting the size of the mirrored memory segment based on the % write IOs, which may be calculated as the total number of write IOs divided by the total number of IOs. Specifically, the mirrored memory segment size equals the product of the % write IOs and the data slots size. Step 704 is setting the size of the non-mirrored memory segment based on the % read IOs, which may be calculated as the total number of read IOs divided by the total number of IOs. Specifically, the non-mirrored memory segment size equals the product of the % read IOs and the data slots size. Together, the mirrored memory segment and non-mirrored memory segment equal 100% of the data slots size. It will be understood by those of ordinary skill in the art that the calculations set the relative sizes of the mirrored and non-mirrored memory segments to match the relative sizes of the write and read loads represented in the IO traffic workload profile. In the illustrated example, the IO workload exhibits a write percentage of about 50%, so the size of the mirrored memory segment is about 50% of the size of the data slots.

Step 706 is setting the sizes of the mirrored memory pools. The number of pools and the sizes of the BE-TRKs associated with each pool may be preconfigured. For each pool N, the size of the pool is set to the product of the % write IOs within the range of the pool and the size of the mirrored memory segment. The % write IOs within the range of the pool is calculated based on the preconfigured pool sizes and write IO sizes from the IO traffic workload profile. An IO is within the size of the pool for which the BE-TRK size is closest in size to the size of the IO and for which the BE-TRK size is ≥the IO size. For example, the write IOs within the range of the 16 KB pool are ≤16 KB, the write IOs within the range of the 64 KB pool are >16 KB and ≤64 KB, and the write IOs within the range of the 128 KB pool are >64 KB. It will be understood by those of ordinary skill in the art that the calculations set the relative sizes of the pools to match the distribution of write sizes represented in the IO traffic workload profile. In the illustrated example, 2% of write IOs are 16 KB in size, 4% of writes are 128 KB size, and 94% of writes are 64 KB in size, so the 16 KB pool size is 2% of the size of the mirrored memory segment, the 64 KB pool size is 94% of the size of the mirrored memory segment, and the 128 KB pool size is 4% of the size of the mirrored memory segment.

Step 708 is setting the sizes of the non-mirrored memory pools. The number of pools and the sizes of the BE-TRKs associated with each pool may be preconfigured. For each pool N, the size of the pool is set to the product of the % read IOs within the range of the pool and the size of the non-mirrored memory segment. The % read IOs within the range of the pool is calculated based on the preconfigured pool sizes and write IO sizes from the IO traffic workload profile. An IO is within the size of the pool for which the BE-TRK size is closest in size to the size of the IO and for which the BE-TRK size is ≥the IO size. For example, the read IOs within the range of the 32 KB pool are ≤32 KB, the write IOs within the range of the 64 KB pool are >32 KB and ≤64 KB, and the write IOs within the range of the 128 KB pool are >64 KB. It will be understood by those of ordinary skill in the art that the calculations set the relative sizes of the pools to match the distribution of read sizes represented in the IO traffic workload profile.

Step 710 is outputting the shared cache segmentation configuration. The configuration indicates the mirrored memory segment size, the non-mirrored memory segment size, the sizes of the mirrored memory pools, and the sizes of the non-mirrored memory pools. Step 712 is configuring the shared cache of the storage array in accordance with the shared cache segmentation configuration. Although advantages should not be considered to be required, it will be appreciated by those of ordinary skill in the art that the storage array configured in accordance with the shared cache segmentation configuration will be capable of more efficiently processing IO workloads similar to the historical IO traffic workload than a storage array with a default configuration that does not match the historical IO traffic workload Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
for a storage node comprising: a first compute node with a first local memory, a portion of which is allocated to a shared cache; and a second compute node with a second local memory, a portion of which is allocated to the shared cache:
calculating a mirrored memory segment size for the storage node based on an historical traffic workload as a product of percentage of write input-outputs (IOs) in the historical traffic workload and size of a portion of the shared cache allocated for data;
calculating sizes of a plurality of pools of different size slots in the mirrored memory segment based on distribution of write IO sizes in the historical traffic workload as a product of percent write IOs within a range of the pool and the size of the mirrored memory segment
configuring the shared cache with a mirrored memory segment characterized by the calculated size and pools characterized by the calculated sizes;
calculating a non-mirrored memory segment size for the storage node based on the historical traffic workload as a product of percentage of read IOs in the historical traffic workload and the size of a portion of the shared cache allocated for data; and
configuring the shared cache with a non-mirrored memory segment characterized by the calculated size.

2. The method of claim 1 further comprising calculating sizes of a plurality of pools of different size slots in the non-mirrored memory segment based on distribution of read IO sizes in the historical traffic workload as a product of percent read IOs within a range of the pool and the size of the non-mirrored memory segment.

3. A non-transitory computer-readable storage medium storing instructions that when executed by a computer perform a method comprising:
for a storage node based on an historical traffic workload, the storage node comprising: a first compute node with a first local memory, a portion of which is allocated to a shared cache; and a second compute node with a second local memory, a portion of which is allocated to the shared cache:
calculating a mirrored memory segment size for the storage node based on an historical traffic workload as a product of percentage of write input-outputs (IOs) in the historical traffic workload and size of a portion of the shared cache allocated for data;
calculating sizes of a plurality of pools of different size slots in the mirrored memory segment based on distribution of write IO sizes in the historical traffic workload as a product of percent write IOs within a range of the pool and the size of the mirrored memory segment
configuring the shared cache with a mirrored memory segment characterized by the calculated size and pools characterized by the calculated sizes;
calculating a non-mirrored memory segment size for the storage node based on the historical traffic workload as a product of percentage of read IOs in the historical traffic workload and the size of a portion of the shared cache allocated for data; and
configuring the shared cache with a non-mirrored memory segment characterized by the calculated size.

4. The non-transitory computer-readable storage medium of claim 3 in which the method further comprises calculating sizes of a plurality of pools of different size slots in the non-mirrored memory segment based on distribution of read IO sizes in the historical traffic workload as a product of percent read IOs within a range of the pool and the size of the non-mirrored memory segment.

5. An apparatus, comprising:
a storage node comprising a first compute node with a first local memory, a portion of which is allocated to a shared cache, and a second compute node with a second local memory, a portion of which is allocated to the shared cache, the shared cache configured with:
a mirrored memory segment characterized by a size calculated based on an historical traffic workload as a product of percentage of write input-outputs (IOs) in the historical traffic workload and size of a portion of the shared cache allocated for data in which the shared cache is configured with a plurality of pools associated with different slot sizes and the sizes of the plurality of pools in the mirrored memory segment is calculated based on distribution of write IO sizes in the historical traffic workload as a product of percent write IOs within a range of the pool and the size of the mirrored memory segment; and
a non-mirrored memory segment characterized by a size calculated based on the historical traffic workload as a product of percentage of read IOs in the historical traffic workload and the size of a portion of the shared cache allocated for data.

6. The apparatus of claim 5 in which the shared cache is configured with a plurality of pools associated with different slot sizes and the sizes of the plurality of pools in the non-mirrored memory segment is calculated based on distribution of read IO sizes in the historical traffic workload as a product of percent read IOs within a range of the pool and the size of the non-mirrored memory segment.

\* \* \* \* \*